United States Patent
He (10) Patent No.: US 11,936,582 B2
(45) Date of Patent: Mar. 19, 2024

(54) RESOURCE INDICATION METHOD, ELECTRONIC DEVICE AND STORAGE MEDIUM

(71) Applicant: GUANGDONG OPPO MOBILE TELECOMMUNICATIONS CORP., LTD., Guangdong (CN)

(72) Inventor: Chuanfeng He, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/179,356

(22) Filed: Mar. 6, 2023

(65) Prior Publication Data

US 2023/0208587 A1   Jun. 29, 2023

Related U.S. Application Data (63) Continuation of application No. PCT/CN2020/117201, filed on Sep. 23, 2020.

(51) Int. Cl.
| | |
|---|---|
| H04W 72/04 | (2023.01) |
| H04L 5/00 | (2006.01) |
| H04W 52/02 | (2009.01) |
| H04W 76/00 | (2018.01) |
| H04W 88/08 | (2009.01) |
| H04W 76/28 | (2018.01) |

(52) U.S. Cl.
CPC ....... *H04L 5/0048* (2013.01); *H04W 52/0235* (2013.01); *H04W 76/28* (2018.02)

(58) Field of Classification Search
CPC .. H04L 5/0048; H04W 52/0229; H04W 76/28

USPC .......................................................... 370/329
See application file for complete search history.

(56) References Cited

U.S. PATENT DOCUMENTS

| | | | |
|---|---|---|---|
| 2019/0254110 A1 | 8/2019 | He et al. | |
| 2020/0029238 A1 | 1/2020 | Si et al. | |
| 2020/0112917 A1 | 4/2020 | Nam et al. | |
| 2020/0214082 A1 | 7/2020 | Luo et al. | |
| 2020/0413340 A1* | 12/2020 | Nam | H04W 24/10 |

(Continued)

FOREIGN PATENT DOCUMENTS

| | | | |
|---|---|---|---|
| CN | 109547174 A | 3/2019 | |
| CN | 110831120 A * | 2/2020 | H04L 5/0048 |

(Continued)

OTHER PUBLICATIONS

Intel (R1-1904317, "On PDCCH-based power saving signal", Xi'an, China, Apr. 8-12, 2019) (Year: 2019).*

(Continued)

*Primary Examiner* — Maharishi V Khirodhar
(74) *Attorney, Agent, or Firm* — Ladas & Parry, LLP (57) ABSTRACT

The present application discloses a resource indication method, including: a terminal device receives information; and the terminal device determines reference signal resource indication information and power saving wake-up indication information according to the information, where the reference signal resource indication information is used for indicating a resource for transmitting a reference signal. The present application further discloses another resource indication method, an electronic device, and a storage medium.

8 Claims, 4 Drawing Sheets

(56) References Cited

U.S. PATENT DOCUMENTS

2021/0329591 A1 10/2021 Hwang et al.
2022/0264460 A1* 8/2022 Seo .................. H04W 72/0446

FOREIGN PATENT DOCUMENTS

| CN | 110831120 A | | 2/2020 | |
|---|---|---|---|---|
| CN | 111585724 A | | 8/2020 | |
| CN | 110831125 B | * | 8/2021 | ........ H04W 52/0212 |
| WO | 2020032739 A1 | | 2/2020 | |

OTHER PUBLICATIONS

International Search Report (ISR) dated Jun. 21, 2021 for Application No. PCT/CN2020/117201, and its English translation provided by WIPO.
Written Opinion(WOSA) dated Jun. 21, 2021 for Application No. PCT/CN2020/117201, and its English translation provided by Google Translate.
Samsung, "TRS/CSI-RS for idle/inactive UEs"; R1-2006158, 3GPP TSG RAN WG1 #102, e-Meeting, Aug. 17-Jun. 28, 2020, all pages.
3GPP TS 38.212 V16.1.0 (Mar. 2020); 3rd Generation Partnership Project; Technical Specification Group Radio Access Network; NR; Multiplexing and channel coding (Release 16), all pages.
3GPP TS 38.213 V16.2.0 (Jun. 2020); 3rd Generation Partnership Project; Technical Specification Group Radio Access Network; NR; Physical layer procedures for control (Release 16), all pages.
3GPP TS 38.331 V16.0.0 (Mar. 2020); 3rd Generation Partnership Project; Technical Specification Group Radio Access Network; NR; Radio Resource Control (RRC) protocol specification (Release 16), all pages.
The Extended European Search Report of corresponding European application No. 20954459.2, dated Sep. 25, 2023.

* cited by examiner

A network device sends information; where the information is used for a terminal device to determine reference signal resource indication information and power saving wake-up indication information, where the reference signal resource indication information is used for indicating a resource for transmitting a reference signal  ⸺S301

RESOURCE INDICATION METHOD, ELECTRONIC DEVICE AND STORAGE MEDIUM

CROSS-REFERENCE TO RELATED APPLICATIONS

This application is a continuation of International Application No. PCT/CN2020/117201, filed on Sep. 23, 2020, the disclosure of which is hereby incorporated by reference in its entirety.

TECHNICAL FIELD

The present application relates to the technical field of wireless communication, and in particular, to a resource indication method, an electronic device and a storage medium.

BACKGROUND

With the proposal of power saving for terminal device (User Equipment, UE), how to efficiently realize power saving of a terminal device is always a goal pursued.

SUMMARY

Embodiments of the present application provide a resource indication method, an electronic device and a storage medium, which can efficiently realize power saving of a terminal device.

According to a first aspect, an embodiment of the present application provides a resource indication method, including: receiving, by a terminal device, information; and determining, by the terminal device, reference signal resource indication information and power saving wake-up indication information according to the information, where the reference signal resource indication information is used for indicating a resource for a transmitting reference signal.

According to a second aspect, an embodiment of the present application provides a resource indication method, including: sending, by a network device, information; where the information is used for a terminal device to determine reference signal resource indication information and power saving wake-up indication information, and the reference signal resource indication information is used for indicating a resource for transmitting a reference signal.

According to a third aspect, an embodiment of the present application provides a terminal device, where the terminal device includes:

a receiving unit, configured to receive information;

a processing unit, configured to determine reference signal resource indication information and power saving wake-up indication information according to the information, where the reference signal resource indication information is used for indicating a resource for transmitting a reference signal.

According to a fourth aspect, an embodiment of the present application provides a network device, where the network device includes: a sending unit, configured to send information; where the information is used for a terminal device to determine reference signal resource indication information and power saving wake-up indication information, and the reference signal resource indication information is used for indicating a resource for transmitting a reference signal.

According to a fifth aspect, an embodiment of the present application provides a terminal device, including a processor and a memory configured to store a computer program that is capable of being run on the processor, where the processor is configured to execute steps of the resource indication method executed by the terminal device when running the computer program.

According to a sixth aspect, an embodiment of the present application provides a network device, including a processor and a memory configured to store a computer program that is capable of being run on the processor, where the processor is configured to execute steps of the resource indication method executed by the network device when running the computer program.

According to a seventh aspect, an embodiment of the present application provides a chip, including: a processor configured to call and run a computer program from a memory to cause a device installed with the chip to execute the resource indication method executed by the terminal device.

According to an eighth aspect, an embodiment of the present application provides a chip, including: a processor configured to call and run computer programs from a memory to cause a device installed with the chip to execute the resource indication method executed by the network device.

According to a ninth aspect, an embodiment of the present application provides a storage medium storing an executable program, which, when executed by a processor, implements the resource indication method executed by the terminal device.

According to a tenth aspect, an embodiment of the present application provides a storage medium storing an executable program, which, when executed by a processor, implement the resource indication method executed by the network device.

According to an eleventh aspect, an embodiment of the present application provides a computer program product including computer program instructions, where the computer program instructions cause a computer to execute the resource indication method executed by the terminal device According to a twelfth aspect, an embodiment of the present application provides a computer program product including computer program instructions, where the computer program instructions cause a computer to execute the resource indication method executed by the network device According to a thirteenth aspect, an embodiment of the present application provides a computer program, where the computer program causes a computer to execute the resource indication method executed by the terminal device.

According to a fourteenth aspect, an embodiment of the present application provides a computer program, where the computer program causes a computer to execute the resource indication method executed by the network device.

The resource indication method, the electronic device and the storage medium provided by the embodiments of the present application include: a terminal device receives information; and the terminal device determines reference signal resource indication information and power saving wake-up indication information according to the information, where the reference signal resource indication information is used for indicating a resource for transmitting a reference signal. In this way, the terminal device can determine the reference signal resource indication information through the received information, and determine the resource for transmitting the reference signal according to the reference signal resource indication information; and then the terminal device can receive the reference signal over the resource for transmitting the reference signal, and perform time-frequency tracking based on the reference signal. The terminal device can determine the reference signal for the time-frequency tracking according to the received information, thus avoiding the waste of resources caused when the terminal device (such as a terminal device in the idle state) wakes up many times to receive a synchronization signal block (SSB) before a paging occasion (PO) for realizing time-frequency tracking but it is not paged in the PO, thereby effectively realizing power saving of the terminal device.

DESCRIPTION OF EMBODIMENTS

In order to understand characteristics and technical contents of embodiments of the present application in more detail, the implementation of the embodiments of the present application is described in detail below with reference to accompanying drawings. The accompanying drawings are for reference only and are not intended to limit the embodiments of the present application.

Before the embodiments of the present application are described, related content is briefly described.

In order to save power consumption of a terminal device, a discontinuous reception (DRX) mechanism is used in a long term evolution (LTE) system and a new radio (NR) system, which makes the terminal device enter a discontinuous reception state instead of turning on the receiver all the time when there is no data reception, so as to realize the purpose of saving power. The DRX mechanism includes configuring a DRX cycle for a terminal in a radio resource control connected (RRC_CONNECTED) state, one DRX cycle consisting of an On Duration and an Opportunity for DRX. During a DRX On Duration, the terminal device monitors and receives signals and downlink channels including a physical downlink control channel (PDCCH); and during an "Opportunity for DRX" time, the terminal device does not receive signals and downlink channels, such as a PDCCH, to reduce power consumption. A terminal device in a radio resource control idle (RRC_idle) state needs to receive a paging message in a similar way to DRX. There is a paging occasion (PO) within a DRX cycle, the terminal device only receives the paging message at the PO, and does not receive the paging message at the time outside the PO, so as to realize the purpose of saving power. The terminal device determines whether there is a paging message by detecting a PDCCH signal scrambled by a paging radio network temporary identity (P-RNTI) in the PO.

In the evolution of NR system, higher requirements are put forward for power saving of terminal device. For example, for the existing DRX mechanism, during each On Duration, the terminal device needs to continuously detect the PDCCH to determine whether the network device schedules data transmission to the terminal device. However, for most terminal devices, there may be no need to receive data transmission for a long time, but it is still necessary to maintain a regular wake-up mechanism to monitor possible downlink transmission; there is further optimized space for the power saving of such terminal devices. The case where the terminal device in the RRC_idle state receives the paging message is also similar to the above.

Figure 1:
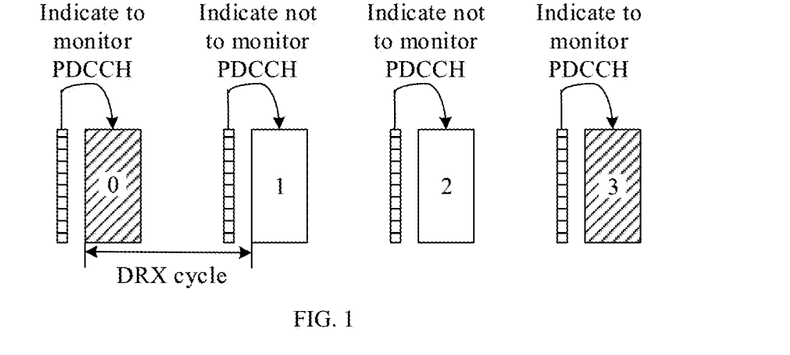
FIG. 1 is a schematic diagram of indicating, through a power saving signal, whether a terminal device monitors a physical downlink control channel (PDCCH) during a discontinuous reception (DRX) On Duration according to an embodiment of the present application.

In version (R16), a power saving signal is introduced to further realize the power saving of the terminal device. Combining the power saving signal with the DRX mechanism, the terminal device receives an indication of a power saving wake-up indication signal before an DRX ON Duration. When the terminal device has data transmission within a DRX cycle, the power saving wake-up indication signal "wakes up" the terminal device to monitor the PDCCH during the DRX On Duration; otherwise, when the terminal device has no data transmission within a DRX cycle, the power saving wake-up signal does not "wake up" the terminal, and the terminal does not need to monitor the PDCCH during the DRX On Duration. Compare with that existing DRX mechanism, when the terminal device has no data transmission, the terminal device may omit monitoring the PDCCH during the DRX On Duration, thus realizing the power saving of the terminal device. A time when the terminal device is not in the DRX On Duration is called an inactive time, and a time in the DRX on Duration is referred to as an activate time. The process of indicating, through the power saving signal, whether the terminal device monitors the PDCCH during the DRX On Duration, is as shown in FIG. 1; if the power saving signal indicates to monitor the PDCCH, the PDCCH is monitored within the DRX cycle; if the power saving signal indicates not to monitor the PDCCH, the PDCCH is not monitored within the DRX cycle.

Figure 2:
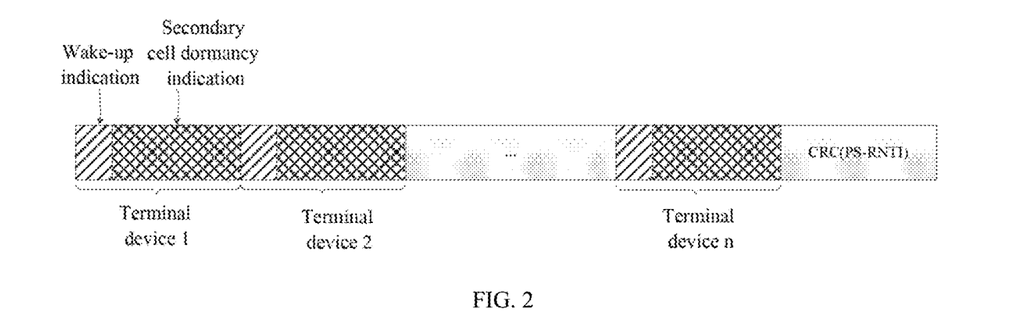
FIG. 2 is a schematic diagram of a power saving signal carrying power saving wake-up indication information for a plurality of terminal devices according to an embodiment of the present application.

In R16, the power saving signal is carried by the newly defined downlink control information (DCI) format 2_6. The network device configures the terminal device to detect a search space set carrying PDCCH of DCI format 2_6. In the power saving signal, the number of bits required by each terminal device is up to 6, including 1 bit for representing power saving wake-up indication information and at most 5 bits for indicating secondary cell dormancy indication information. The power saving signal may carry indication bits for a plurality of terminal devices to improve the utilization efficiency of resources in the system. FIG. 2 shows a schematic diagram of a power saving signal carrying power saving wake-up indication information for a plurality of terminal devices. The bit of the power saving wake-up indication information notified by the network device to each terminal device is in a start position of DCI, and the quantity of bits of each terminal device may be implicitly obtained by a configured secondary cell (carrier) group quantity; where the quantity of bits of the wake-up indication must not be zero, but the quantity of bits of the secondary cell (carrier) dormancy indication may be 0. Further, the network device may also inform the terminal device of the total quantity of bits of DCI and a PS-RNTI by which the PDCCH is scrambled.

Monitoring occasion of the PDCCH is related to the time window of the DRX On Duration. The network device is configured with a time offset (PS-offset) to determine a start point of the monitoring occasion of the PDCCH. After determining the start point of the monitoring occasion of the PDCCH, it is necessary to further determine an end point of monitoring the PDCCH; the end point of monitoring the PDCCH is determined by the device capability of the terminal device. The terminal device needs to perform operations such as device wake-up and initialization after wake-up within the minimum time interval before the DRX ON Duration. Therefore, the terminal device does not need to monitor the power saving wake-up signal within the minimum time interval before the DRX ON Duration. A terminal device with faster processing speed may use a shorter minimum time interval, shown as "Value 1" in Table 1 below; however, a terminal device with slower processing speed needs to use a longer minimum time interval, shown as "Value 2" in Table 1 below.

TABLE 1

| Minimum time interval | | |
| --- | --- | --- |
| | Minimum time interval (slots) | |
| Subcarrier spacing (kHz) | Value 1 | Value 2 |
| 15 | 1 | 3 |
| 30 | 1 | 6 |
| 60 | 1 | 12 |
| 120 | 2 | 24 |

Figure 3:
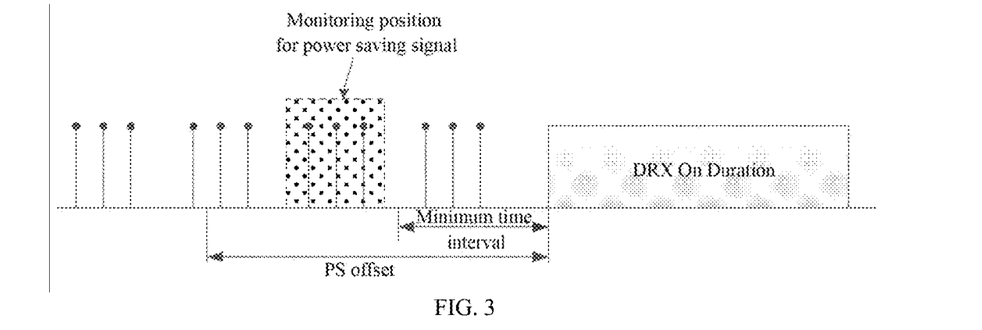
FIG. 3 is a schematic diagram of a monitoring occasion for a terminal device to monitor a power saving signal according to an embodiment of the present application.

The power saving signal takes a time position indicated by the PS-offset configured by the network device as a start point, and monitors the power saving signal within a complete PDCCH search space cycle (defined by a parameter "duration" of the PDCCH search space) after the start point, and a position of the monitored power saving signal is before a time period corresponding to the minimum time interval. As shown in FIG. 3 below, the terminal device monitors the monitoring occasion of the power saving signal identified by the dotted box.

In an NR system, a network device may send paging to a terminal device in an idle state and a connected state. The paging process may be triggered by a core network or the network device, and is used to send a paging request to a terminal device in the idle state, or to notify system information update, or to notify a terminal device to receive one or more of the information such as earthquake and tsunami warning information (Earthquake and Tsunami Warning System, ETWS) or commercial mobile alert service (Commercial Mobile Alert System, CMAS). After receiving a paging message from the core network, the network device parses contents therein to obtain a tracking area identity (TAI) list of the terminal device, and carries out air paging in a cell in a tracking area in a subordinate list of the TAI list. The core network domain of the paging message is not decoded by the network device, but passed through to the terminal device. After receiving the paging message sent by the core network, the network device aggregates paging messages of terminal devices with a same PO into one paging message, and transmits it to the related terminal devices through a paging channel. By receiving paging parameters through a system message, the terminal device may determine positions of the public paging frame and paging occasion of the cell, and use the positions of the paging frame and paging occasion of the terminal device calculated with its own terminal device identifier (UE_ID) to receive the paging message at a corresponding time. The paging message is carried through a physical downlink shared channel (PDSCH), and the terminal device obtains paging indication information by detecting a PDCCH scrambled by P-RNTI, so as to receive the paging message. The terminal device in the idle state will save power by means of DRX, and the terminal device will obtain DRX related information from system information block 2, SIB2. The paging message is received through monitoring a PDCCH scrambled by P-RNTI in the PO on a PF within a DRX cycle.

Figure 4:
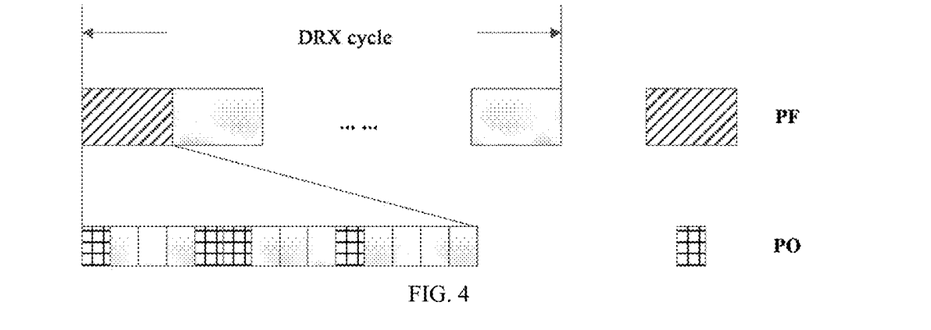
FIG. 4 is a schematic diagram of positions of a paging frame (PF) and POs within a DRX cycle according to an embodiment of the present application.

The PF indicates a system frame number where the paging message appears, and the PO indicates a time when the paging message may appear. One PF frame may include one or more POs, and for every DRX cycle or paging cycle, the terminal device only needs to monitor its own PO. A frame with a system frame number (SFN) satisfying the following formula can be used as a PF frame:

the SFN of a PF is determined by the following formula:

$$(SFN+PF\_offset) \bmod T = (T \operatorname{div} N)*(UE\_ID \bmod N) \quad (1)$$

the index Index_(i_s) of PO in the PF is determined by the following formula:

$$i\_s = \operatorname{floor}(UE\_ID/N) \bmod Ns \quad (2)$$

where, T is a DRX cycle for the terminal device to receive Paging. The network device will broadcast a default DRX cycle (T_sib); if the network device configures a DRX cycle (T_ue) specific to the terminal device for the terminal device through RRC signaling/high-layer signaling, the minimum of the DRX cycle broadcast by the network device and the DRX cycle specific to the terminal device configured through RRC signaling/high-layer signaling is taken as the DRX cycle of the terminal device, that is, T=min(T_sib, T_ue). If the network device does not configure a DRX cycle specific to the terminal device for the terminal device through RRC signaling/high-layer signaling, the DRX cycle broadcast by the network device is taken as the DRX cycle of the UE. N is the quantity of PFs included within one DRX cycle. Ns is the quantity of POs included in one PF, and PF-offset is a time-domain offset used to determine PF. UE_ID is 5G-S-TMSI mod 1024. FIG. 4 shows a schematic diagram of the positions of PF and POs within a DRX cycle, where there are multiple POs in one PF.

When the terminal device is in the DRX state, the terminal device needs to perform time-frequency synchronization before the DRX ON Duration to receive the PDCCH during the DRX ON Duration. For the terminal device in the connected state, time-frequency synchronization may be performed by configured reference information such as a channel-state information reference signal (CSI-RS) and a tracking reference signal (TRS), or by a synchronization signal block (SSB) sent by the cell. For the terminal device in the idle state, the terminal device also needs to perform time-frequency tracking and automatic gain control (AGC) before detecting paging in a corresponding PO; because the UE in the idle state is not configured with reference signals such as CSI-RS and TRS, time-frequency synchronization can only be performed by the SSB sent periodically. To reduce the power consumption of receiving paging, the power saving wake-up indication information in the power saving information introduced in R17 is mainly used for indicating whether the terminal device receives paging in the corresponding the PO. In order to further realize the power saving of the terminal device, the terminal device may perform time-frequency tracking through the SSB after detecting the power saving information and determining that it is needed to receive paging in the corresponding PO. The applicant found that SSB transmission has a certain period, and SSB distribution is relatively scattered, so the terminal device must wake up many times to receive the SSB before the PO. However, if the terminal device is not paged in the PO but wakes up many times to receive SSB, a waste of power consumption will inevitably be caused.

Technical solutions according to embodiments of the present application may be applied to various communication systems, such as a global system of mobile communication (GSM) system, a code division multiple access (CDMA) system, a wideband code division multiple access (WCDMA) system, a general packet radio service (GPRS), an LTE system, an LTE frequency division duplex (FDD) system, an LTE time division duplex (TDD) system, an advanced long term evolution (LTE-A) system, an NR system, an evolution system of an NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area network (WLAN), wireless fidelity (WiFi), a next generation communication system or other communication systems, etc.

System architecture and traffic scenarios described in the embodiments of the present application are to explain the technical solutions of the embodiments of the present application more clearly, and do not constitute a limitation on the technical solutions provided by the embodiments of the present application. As a person skilled in the art knows, with the evolution of network architecture and the emergence of new traffic scenarios, the technical solutions provided by the embodiments of the present application are also applicable to similar technical problems.

The network device involved in the embodiments of the present application may be a common base station (such as a NodeB or an eNB or a gNB), a new radio controller (NR controller), a centralized network element (centralized unit), a new wireless base station, a radio frequency remote module, a micro base station, a relay, a distributed network element (distributed unit), a transmission reception point (TRP), a transmission point (TP) or any other device. The embodiments of the present application do not limit the specific technology and specific device form adopted by the network device. For convenience of description, in all embodiments of the present application, the above-mentioned devices which provide wireless communication functions for the terminal device are collectively referred to as network devices.

In the embodiments of the present application, the terminal device may be any terminal. For example, the terminal device may be a user device of machine-type communication. That is to say, the terminal device may also be called a user equipment UE, a mobile station (MS), a mobile terminal, a terminal, etc. The terminal device may communicate with one or more core networks via a radio access network (RAN). For example, the terminal device may be a mobile phone (or called as a "cellular" phone), a computer with a mobile terminal, etc. For example, the terminal device may also be a portable, pocket-sized, handheld, computer-built-in or vehicle-mounted mobile apparatus, which exchanges voice and/or data with the radio access network. There is no specific limitation in the embodiments of the present application.

In an implementation, the network device and the terminal device may be deployed on land, including indoor or outdoor, handheld or vehicle-mounted; may also be deployed on a water surface; may also be deployed on airplanes, balloons and satellites in the air. The embodiments of the present application do not limit the application scenarios of the network device and the terminal device.

In an implementation, communication between the network device and the terminal device, and between the terminal device and the terminal device may be carried out through licensed spectrum, or through unlicensed spectrum, or through both licensed spectrum and unlicensed spectrum. Communication between the network device and the terminal device and between the terminal device and the terminal device may be carried out through the frequency spectrum below 7 gigahertz (GHz), or through the frequency spectrum above 7 GHz, or by using both the frequency spectrum below 7 GHz and the frequency spectrum above 7 GHz. The embodiments of the present application do not limit the spectrum resources used between the network device and the terminal device.

Generally, the number of connections supported by traditional communication systems is limited and easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, etc., and the embodiments of the present application may also be applied to these communication systems.

Figure 5:
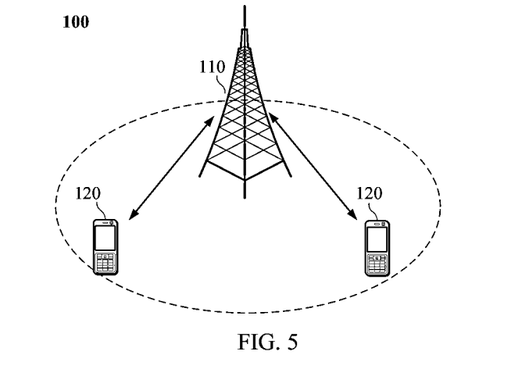
FIG. 5 is a schematic diagram of a composition structure of a communication system provided by an embodiment of the present application.

Illustratively, a communication system 100 applied by an embodiment of the present application is as shown in FIG. 5. The communication system 100 may include a network device 110, and the network device 110 may be a device that communicates with a terminal device 120 (or called as a communication terminal, a terminal). The network device 110 may provide communication coverage for a specific geographical area, and may communicate with terminal devices located in the coverage area. In an implementation, the network device 110 may be a base station (Base Transceiver Station, BTS) in a GSM system or a CDMA system, a base station (eNodeB, NB) in a WCDMA system, or an evolutional base station (Evolutional Node B, eNB or eNB) in an LTE system, or a radio controller in a cloud radio access network (CRAN), or the network device may be a mobile switching center, a relay station, an access point, a vehicle-mounted device, a wearable device, a hub, a switch, a bridge, a router, a network-side device in a 5G network, or a network device in a future evolved public land mobile network (PLMN), etc.

The communication system 100 further includes at least one terminal device 120 located in the coverage area of the network device 110. As used herein, the "terminal device" includes, but is not limited to, being connected via a wired line, such as a public switched telephone network (PSTN), a digital subscriber line (DSL), a digital cable or a direct cable; and/or another data connection/network; and/or via a wireless interface, for example, a cellular network, a wireless local area network (WLAN), a digital television network such as a DVB-H network, a satellite network, an AM-FM broadcast transmitter; and/or apparatuses of another terminal device configured to receive/send communication signals; and/or an internet of things (IoT) device. A terminal device which is set to communicate through a wireless interface may be called a "wireless communication terminal", a "wireless terminal", or a "mobile terminal". Examples of the mobile terminal include, but are not limited to, a satellite or cellular phone; a personal communications system (PCS) terminal that may combine a cellular radio telephone with data processing, faxing and data communication capabilities; a personal digital assistant (PDA), which may include a radio telephone, a pager, an internet/intranet access, a Web browser, a notebook, a calendar and/or a global positioning system (GPS) receiver; and a conventional laptop and/or palmtop receiver or other electronic device including a radio telephone transceiver. A terminal device may refer to an access terminal, a user equipment (UE), a subscriber unit, a subscriber station, a mobile station, a mobile platform, a remote station, a remote terminal, a mobile device, a user terminal, a terminal, a wireless communication device, a user agent or a user apparatus. The access terminal may be a cellular phone, a cordless phone, a session initiation protocol (SIP) telephone, a wireless local loop (WLL) station, a personal digital assistant (PDA), a handheld device with wireless communication function, a computing device or other processing device connected to a wireless modem, a vehicle-mounted device, a wearable device, a terminal device in a 5G network or a terminal device in a future evolved PLMN, etc.

In an implementation, device to device (D2D) communication may be performed between terminal devices 120.

In an implementation, the 5G system or the 5G network may also be called a new radio (NR) system or an NR network.

FIG. 5 illustratively shows one network device and two terminal devices. In an implementation, the communication system 100 may include multiple network devices, and a coverage area of each network device may include other quantity of terminal devices. The embodiments of the present application are not limited to this.

In an implementation, the communication system 100 may also include other network entities such as a network controller, a mobility management entity, etc., which are not limited by the embodiments of the present application.

It should be understood that devices with communication function in the network/system in the embodiments of the present application may be called communication devices. Taking the communication system 100 shown in FIG. 5 as an example, communication devices may include a network device 110 and terminal devices 120 with communication function, and the network device 110 and the terminal devices 120 may be the above-mentioned specific devices, which will not be described here. The communication devices may also include other devices in the communication system 100, such as a network controller, a mobility management entity and other network entities, which is not limited in the embodiments of the present application.

Figure 6:
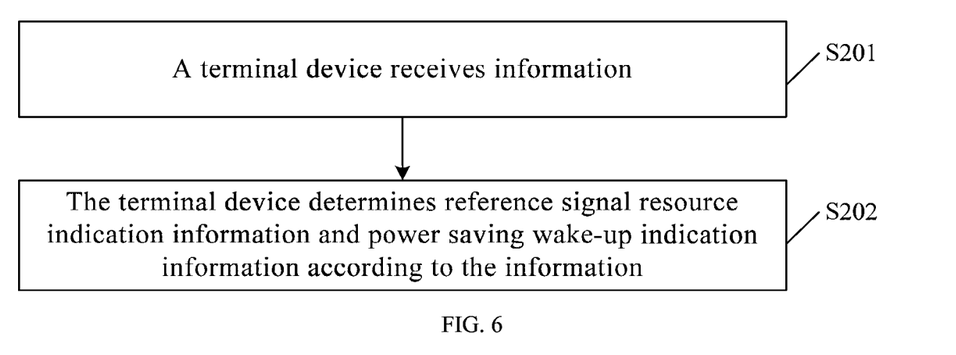
FIG. 6 is a schematic diagram of a processing flow of a resource indication method provided by an embodiment of the present application.

As shown in FIG. 6, a processing flow of a resource indication method provided by an embodiment of the present application, may include the following steps.

S201, a terminal device receives information.

In some embodiments, the information received by the terminal device may be sent by a network device.

In some embodiments, the information may be carried by first DCI with a format of 2-6 (i.e. DCI format 2_6) or second DCI with a format of 1-0 (i.e. DCI format 1-0).

S202, the terminal device determines reference signal resource indication information and power saving wake-up indication information according to the information.

In some embodiments, the reference signal resource indication information is used for indicating a resource for transmitting a reference signal; the reference signal is used for the terminal device to perform time-frequency tracking before a paging occasion arrives; the reference signal at least includes at least one of the following: a channel-state information reference signal (CSI-RS), a demodulation reference signal (DMRS), a tracking reference signal (TRS), a phase tracking reference signal (PTRS) and a positioning reference signal (PRS). Different reference signals have different quasi-colocation information. The power saving wake-up indication information is used to "wake up" the terminal device when there is data transmission in a DRX cycle, so that the terminal device monitors PDCCH during DRX On Duration.

The terminal device determines the reference signal resource indication information and the power saving wake-up indication information according to the information, which may at least include one of the following four implementation manners.

In a first manner, both the reference signal resource indication information and the power saving wake-up indication information may be carried in the information, that is, the reference signal resource indication information and the power saving wake-up indication information may be directly determined through the information.

In this scenario, the information may be carried by the first DCI with the format of 2-6, and the reference signal resource indication information may be indicated by a bit field, other than a bit field corresponding to the power saving wake-up indication information, in the first DCI. In some embodiments, the information may be power saving information.

For example, the first DCI carrying the power saving information includes a first bit field and a second bit field, where the first bit field is used for indicating the power saving wake-up indication information, and the second bit field is used for indicating the reference signal resource indication information, and the first bit field and the second bit field are two different bit fields.

In this scenario, the information may also be carried by the second DCI with the format of 1-0, and the reference signal resource indication information may be indicated by a bit field corresponding to short message information in the second DCI; or, the reference signal resource indication information may also be indicated by a bit field corresponding to a reserved bit in the second DCI. In some embodiments, the information may be power saving information.

For the scenario where the reference signal resource indication information is indicated by the bit field corresponding to the short message information in the second DCI, for example, the bit field corresponding to the short message information in the second DCI includes 8 bits, of which 1 bit is used for representing the power saving wake-up indication information and 7 bits are used for representing the reference signal resource indication information.

For the scenario where the reference signal resource indication information is indicated by a bit field corresponding to a reserved bit in the second DCI, for example, only the short message information is carried in the second DCI, and bit fields other than the bit field carrying the short message information in the second DCI are all reserved bit fields, then the reserved bit fields may be used for representing the reference signal resource indication information.

In the embodiment of the present application, the network device can flexibly indicate to the terminal device the resource of the reference signal used for time-frequency tracking, which is convenient for the terminal device to complete time-frequency tracking between POs and is beneficial to the successful reception of paging messages; moreover, by using the existing power saving information to carry the reference signal resource indication information, the system has good backward compatibility.

In a second manner, the reference signal resource indication information and the power saving wake-up indication information have a corresponding relationship, that is, the information carries one of the reference signal resource indication information and the power saving wake-up indication information, and the power saving wake-up indication information can be determined by the reference signal resource indication information carried in the information, or the reference signal resource indication information can be determined by the power saving wake-up indication information carried in the information.

In a specific implementation, the reference signal resource indication information and the power saving wake-up indication information have a corresponding relationship, which may be that the power saving wake-up indication information and an identifier (ID) of the resource of the reference signal indicated by the reference signal resource indication information have a corresponding relationship. If the information sent by the network device includes a piece of power saving wake-up indication information, and when a value of the bit representing the power saving wake-up indication information is 0, a resource ID of a corresponding reference signal is 1, and when the value of the bit representing the power saving wake-up indication information is 1, the resource ID of the corresponding reference signal is 2. If the information sent by the network device includes a group of power saving wake-up indication information, then a resource ID of a reference signal corresponding to a first piece of power saving wake-up indication information in the group of power saving wake-up indication information is 1, a resource ID of a reference signal corresponding to a second piece of power saving wake-up indication information is 2, and so on.

In a specific implementation, the reference signal resource indication information and the power saving wake-up indication information have a corresponding relationship, which also may be that a time-frequency resource carrying the power saving wake-up indication information and an identifier (ID) of the resource of the reference signal indicated by the reference signal resource indication information have a corresponding relationship. If an ID of the time-frequency resource carrying the power saving wake-up indication information is 1, the resource ID of the reference signal is 1; if the ID of the time-frequency resource carrying the power saving wake-up indication information is 2, the resource ID of the reference signal is 2, and so on.

In the scenario where the reference signal resource indication information and the power saving wake-up indication information have a corresponding relationship, the information may be carried by the first DCI with the format of 2-6 or the second DCI with the format of 1-0; if the information includes the power saving wake-up indication information, the reference signal resource indication information is determined by the power saving wake-up indication information; or, if the information includes the reference signal resource indication information, the power saving wake-up indication information is determined by the reference signal resource indication information.

For example, one bit field in the first DCI or the second DCI carrying the power saving information is used for indicating the power saving wake-up indication information, and since the power saving wake-up indication information and the reference signal resource indication information have a corresponding relationship, the reference signal resource indication information corresponding to the power saving wake-up indication information can be determined according to the corresponding relationship. In a specific implementation, the first DCI or the second DCI may carry a plurality of information blocks, and the power saving wake-up indication information included in each information block corresponds to a piece of reference signal resource indication information, and each piece of power saving wake-up indication information corresponds to a terminal device group; for example, power saving wake-up indication information included in a first information block corresponds to first reference signal resource indication information, and power saving wake-up indication information included in a second information block corresponds to second reference signal resource indication information, and a resource ID of a reference signal indicated by the first reference signal resource indication information is 1, and a resource ID of a reference signal indicated by the second reference signal resource indication information is 2; and so on.

For another example, one bit field in the first DCI or the second DCI carrying the information is used for indicating the reference signal resource indication information, and since the power saving wake-up indication information and the reference signal resource indication information have a corresponding relationship, the power saving wake-up indication information corresponding to the reference signal resource indication information can be determined according to the corresponding relationship. In a specific implementation, the first DCI or the second DCI may carry a plurality of pieces of reference signal resource indication information, each piece of reference signal resource indication information corresponds to a piece of power saving wake-up indication information, and each piece of power saving wake-up indication information corresponds to a terminal device group; for example, first reference signal resource indication information corresponds to first power saving wake-up indication information, and the first power saving wake-up indication information indicates power saving information of a first terminal device group, and second reference signal resource indication information corresponds to second power saving wake-up indication information, and the second power saving wake-up indication information indicates power saving information of a second terminal device group, and a resource ID of a reference signal indicated by the first reference signal resource indication information is 1, and a resource ID of a reference signal indicated by the second reference signal resource indication information is 2; and so on.

In the embodiment of the present application, the reference signal resource indication information and the power saving wake-up indication information have a corresponding relationship, through which the reference signal resource used by the terminal device for time-frequency tracking is implicitly indicated, or the power saving wake-up indication information is implicitly indicated, which can reduce the transmission of control information and save network resources.

In a third manner, a resource for transmitting a reference signal and a sequence carrying the power saving wake-up instruction information have a corresponding relationship. That is, the information carries one of the reference signal resource indication information and the power saving wake-up indication information, and the power saving wake-up indication information can be determined by the reference signal resource indication information carried in the information, or the reference signal resource indication information can be determined by the power saving wake-up indication information.

For example, the information only includes the power saving wake-up indication information, and the power saving wake-up indication information is carried by a sequence (or the information is carried by a sequence), then the reference signal resource indication information and a resource ID of a reference signal indicated by the reference signal resource indication information can be determined according to an ID of the sequence; if a sequence ID of the sequence is 1, it can be determined that a resource ID of a reference signal corresponding to the sequence ID being 1 is 1; if the sequence ID of the sequence is 2, it can be determined that a resource ID of a reference signal corresponding to the sequence ID being 2 is 2, and so on. Or, the information only includes the reference signal resource indication information, and if a resource ID of a reference signal indicated by the reference signal resource indication information is 1, it can be determined that an ID of the sequence carrying the power saving wake-up indication information corresponding to the resource ID of the reference signal being 1 is 1; if a resource ID of a reference signal indicated by the reference signal resource indication information is 2, it can be determined that an ID of the sequence carrying the power saving wake-up indication information corresponding to the resource ID of the reference signal being 2 is 2; and so on.

In the embodiment of the present application, the power saving wake-up instruction information is carried by using a sequence, and through the corresponding relationship between the resource for transmitting the reference signal and the sequence carrying the power saving wake-up instruction information, the reference signal resource used by the terminal device for time-frequency tracking is implicitly indicated, or the sequence carrying the power saving wake-up instruction information is implicitly indicated, which can reduce the transmission of control information and save network resources.

In a fourth manner, a resource for transmitting a reference signal indicated by the reference signal resource indication information has a corresponding relationship with a sequence carrying the power saving wake-up indication information and a time-frequency resource of the sequences carrying the power saving wake-up indication information. That is, the information carries one of the reference signal resource indication information and the power saving wake-up indication information, and the power saving wake-up indication information can be determined by the reference signal resource indication information carried in the information, or the reference signal resource indication information can be determined by the power saving wake-up indication information.

For example, the information only includes the power saving wake-up indication information, and the power saving wake-up indication information is carried by a sequence (or the information is carried by a sequence), then a resource ID of a reference signal indicated by the reference signal resource indication information can be determined according to an ID of the sequence and a time-frequency resource carrying the sequence; if a sequence ID of the sequence is 1 and an ID of the time-frequency resource carrying the sequence is 1, then according to the sequence ID being 1 and the ID of the time-frequency resource carrying the sequence being 1, it can be determined that a resource ID of a corresponding reference signal is 1; if a sequence ID of the sequence is 2 and an ID of the time-frequency resource carrying the sequence is 2, then according to the sequence ID being 2 and the ID of the time-frequency resource carrying the sequence being 2, it can be determined that a resource ID of a corresponding reference signal is 2. Or, the information only includes the reference signal resource indication information, and if a resource ID of a reference signal indicated by the reference signal resource indication information is 1, then it can be determined that a sequence ID carrying the power saving wake-up indication information corresponding to the resource ID of the reference signal being 1 is 1, and the ID of the time-frequency resource carrying the sequence is 1; if a resource ID of a reference signal indicated by the reference signal resource indication information is 2, then it can be determined that a sequence ID carrying the power saving wake-up indication information corresponding to the resource ID of the reference signal being 2 is 2, and the ID of the time-frequency resource carrying the sequence is 2; and so on.

In the embodiment of the present application, the power saving information is carried by using a sequence, and through the corresponding relationship between the resource for transmitting the reference signal, and the sequence carrying the power saving wake-up instruction information and the time-frequency resource of the sequences carrying the power saving wake-up indication information, the reference signal resource used by the terminal device for time-frequency tracking is implicitly indicated, or the sequence carrying the power saving wake-up instruction information is implicitly indicated, which can reduce the transmission of control information and save network resources.

In step S202, the terminal device may determine the reference signal resource indication information, and may determine the resource of the reference signal according to the reference signal resource indication information, for example, determining that the resource identifier of the reference signal is ID1. In some implementations, the resource indication method may further include:

S203, the terminal device determines a time domain resource of the reference signal.

Taking the resource of the reference signal being a CSI-RS resource as an example, the type of the CSI-RS resource may be configured as one of aperiodic, periodic and semi-persistent, and the configuration information is as follows:

```
a,  - CSI-ResourceConfig
b,  The IE CSI-ResourceConfig defines a group of one or more
NZP-CSI-RS-ResourceSet, CSI-IM-ResourceSet and/or CSI-SSB-ResourceSet.
  c,  CSI-ResourceConfig information element
  d,  -- ASN1START
  e,  -- TAG-CSI-RESOURCECONFIG-START
  f,  CSI-ResourceConfig ::= SEQUENCE {
  g,    csi-ResourceConfigId CSI-ResourceConfigId,
  h,    csi-RS-ResourceSetList CHOICE {
    nzp-CSI-RS-SSB SEQUENCE {
      nzp-CSI-RS-ResourceSetList           SEQUENCE            (SIZE
(1..maxNrofNZP-CSI-RS-ResourceSetsPerConfig))   OF   NZP-CSI-RS-ResourceSetId
OPTIONAL, -- Need R
      csi-SSB-ResourceSetList              SEQUENCE            (SIZE
(1..maxNrofCSI-SSB-ResourceSetsPerConfig))      OF      CSI-SSB-ResourceSetId
OPTIONAL -- Need R
    },
    csi-IM-ResourceSetList                 SEQUENCE            (SIZE
(1..maxNrofCSI-IM-ResourceSetsPerConfig)) OF CSI-IM-ResourceSetId
  },
  bwp-Id BWP-Id,
  resourceType ENUMERATED {aperiodic, semiPersistent, periodic},
  ...
}
  where, "resourceType ENUMERATED {aperiodic, semiPersistent, periodic}" is
used to configure the type of CSI-RS resource.
```

In some scenarios, the CSI-RS may be used for time-frequency tracking before PO, that is, when the terminal device detects the power saving information, it can determine whether to receive a paging message in a corresponding PO according to the power saving wake-up indication information in the power saving information, and determine whether to perform time-frequency tracking to meet a demand of receiving the paging message on the corresponding PO. If the reference signal resource indication information may be determined according to the power saving information, and the type of the reference signal resource indicated by the reference signal resource indication information is a periodic resource, the terminal device needs to determine an effective time period of the reference signal resource in a time domain, that is, to determine a time domain resource of the reference signals.

In the case that the type of the reference signal resource is a periodic resource, the terminal device determining the time domain resource of the reference signal may at least include one of the following two manners.

In a fifth manner, the time domain resource of the reference signal is determined by a time interval between an end time of a time period in which a time domain resource for transmitting the power saving information is located and a start time of a paging occasion or a paging frame corresponding to the power saving information; where the time domain resource for transmitting the power saving information is configured by the network device or pre-configured, and the time domain resource of the reference signal includes a time domain resource corresponding to a time slot in which a reference signal exists in the time interval.

Figure 7:
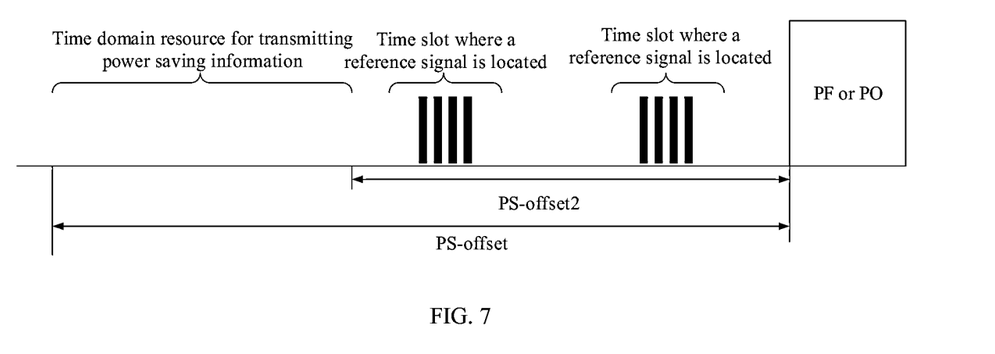
FIG. 7 is a schematic diagram of a processing flow of a terminal device determining a time domain resource of a reference signal according to an embodiment of the present application.

In a specific implementation, a schematic diagram of a terminal device determining a time domain resource of a reference signal is as shown in FIG. 7. The time domain resource of the reference signal is determined by a time interval PS-offset2 between an end time of a time period in which a time domain resource for transmitting the power saving information is located and a start time of a paging occasion or a paging frame corresponding to the power saving information. If the periodic CSI-RS resource indicated by the power saving information has CSI-RS in 2 time slots within the time interval PS-offset2, and CSI-RS exists in 4 symbols in each time slot, the terminal device performs time-frequency tracking according to the CSI-RS resource in these 2 time slots. The time domain resource for transmitting the power saving information is configured by the network device or pre-configured.

The time period in which the time domain resource for transmitting the power saving information is located refers to a time period in which a terminal device may detect a signal or channel carrying the power saving information; that is, the terminal device may detect the signal or channel carrying the power saving information at a start position of the time period; the terminal stops detecting the signal or channel carrying the power saving information at an end position of the time period. A specific time position in the time period at which the signal or channel carrying the power saving information is transmitted is configured by the network device or pre-configured.

In a sixth manner, the time domain resource of the reference signals is determined by a time interval between an end time of a time domain resource of a signal or channel carrying the power saving information, or an end time of a time slot where the time domain resource is located, and a start time of a paging occasion or a paging frame corresponding to the power saving information. The time domain resource of the reference signal includes a time domain resource corresponding to a time slot in which the reference signal exists in the time interval.

Figure 8:
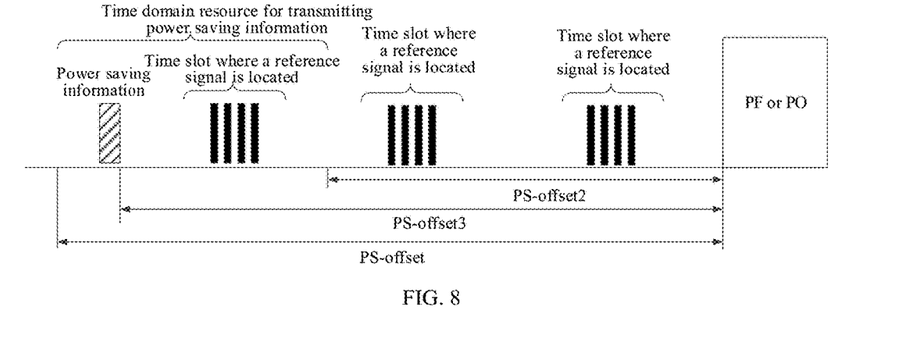
FIG. 8 is a schematic diagram of another processing flow of a terminal device determining a time domain resource of a reference signal provided by an embodiment of the present application.

In a specific implementation, another schematic diagram of a terminal device determining a time domain resource of a reference signal is as shown in FIG. 8. The time domain resource of the reference signal is determined by a time interval PS-offset3 between an end time of a time domain resource of a signal or channel carrying the power saving information, or an end time of a time slot where the time domain resource is located, and a start time of a paging occasion or a paging frame corresponding to the power saving information. If the periodic CSI-RS resource indicated by the power saving information has CSI-RS in 3 time slots within the time interval PS-offset3, and CSI-RS exists in 4 symbols in each time slot, then the terminal device performs time-frequency tracking according to the CSI-RS resource in these 3 time slots.

Figure 9:
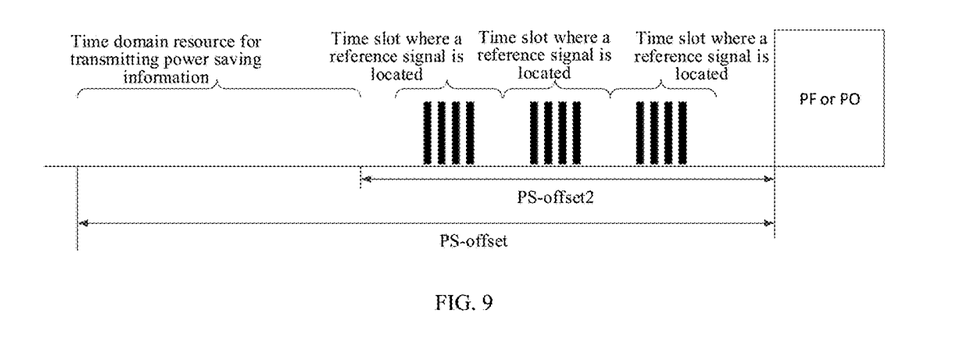
FIG. 9 is a schematic diagram of yet another processing flow of a terminal device determining a time domain resource of a reference signal provided by an embodiment of the present application.

In the case that the type of the reference signal resource is an aperiodic resource, the manner in which the terminal device determines the time domain resource of the reference signal may be that: the terminal device determines the time domain resource of the reference signal in the symbols in one or more time slots by the received information indication or in a predefined way; where the one or more time slots may be time slots in PS-offset2 as shown in FIG. 7 or PS-offset3 as shown in FIG. 8. For example, yet another schematic diagram of the terminal device determining a time domain resource of a reference signal is as shown in FIG. 9, and the time domain resource of the reference signal is determined by a time interval PS-offset2 between an end time of a time period in which a time domain resource for transmitting the power saving information is located and a start time of a paging occasion or a paging frame corresponding to the power saving information. If the periodic CSI-RS resource indicated by the power saving information has CSI-RS in 3 time slots within the time interval PS-offset2, and CSI-RS exists in 4 symbols in each time slot, the terminal device performs time-frequency tracking according to the CSI-RS resource in these 3 time slots. The time domain resource for transmitting the power saving information is configured by the network device or pre-configured.

In the embodiment of the present application, by determining the time domain resource position of the reference signal, the time domain position of the resource of the reference signal for the terminal device to realize time-frequency tracking can be determined, which is convenient for the terminal device to perform time-frequency tracking according to the reference signal.

In the embodiment of the present application, since the frequency domain resources of the PDCCH carrying the paging indication information and the PDSCH carrying the paging message received by the terminal device in the PO are both within the frequency domain resource range of the initial bandwidth part (initial BWP), it is preferable that the frequency domain resource of the reference signal is also included in the frequency domain resource range of the initial BWP.

The different manners in which the terminal device determines the reference signal resource indication information and the power saving wake-up indication information will be described in detail below.

According to the first manner, the information sent by the network device through DCI format 2_6 and received by the terminal device is power saving information, and reference signal resource indication information and power saving wake-up indication information are included in the power saving information, where the power saving information is used for indicating whether the terminal device receives a paging message in a corresponding PO, the reference signal resource indication information is used for indicating a resource of a reference signal, and the resource of the reference signal is used for the terminal device to perform time-frequency tracking, AGC and the like through the reference signal before the PO arrives.

In the related art, the PDCCH search space of DCI format 2_6 carrying the power saving information is a common type of PDCCH search space configured for a terminal device in the connected state, and a monitoring occasion of the PDCCH search space is related to the DRX On Duration. The DCI format 2_6 may carry public power saving information of a plurality of terminal devices. The public power saving information includes a plurality of information blocks, and each information block includes the power saving information of a terminal device or a terminal device group, that is, each information block includes 1 wake-up indication bit and at most 5 secondary cell dormancy indication bits. For a terminal device, which information block in the plurality of information blocks carries the power saving information is indicated by the network device through signaling.

Figure 10:
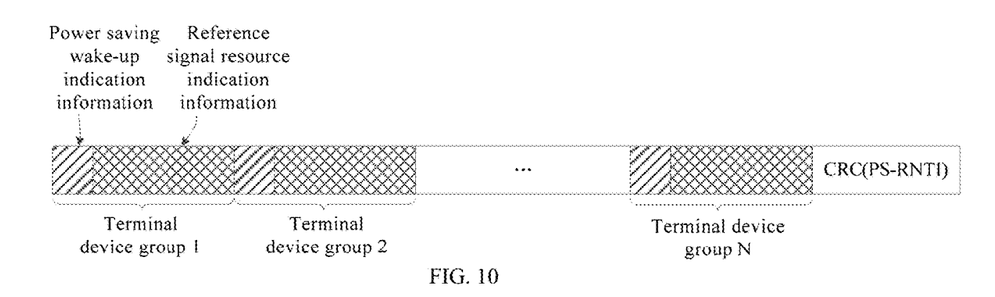
FIG. 10 is a schematic diagram of DCI carrying power saving information and reference signal resource indication information provided by an embodiment of the present application.

In the embodiment of the present application, for a terminal device in a non-connected state, such as a terminal device in the idle state, power saving of the terminal device may be a scenario where the terminal device receives a paging message. For example, the DCI format 2_6 carries power saving information related to a paging message. When the power saving information and the reference signal resource indication information are carried through DCI format 2_6, 5-bit secondary cell dormancy indication bits may be reused to transmit the reference signal resource indication information. A schematic diagram of DCI carrying power saving information and reference signal resource indication information is as shown in FIG. 10, where the DCI format 2_6 carries a plurality of information blocks, each information block corresponds to a terminal device group, and each information block includes power saving wake-up indication information and reference signal resource indication information. The reference signal resource indicated by the reference signal resource indication information may be a resource pre-configured by the network device, such as a reference signal resource set configured by the network device; and the reference signal resource indication information indicates one or more resources in the reference signal resource set; a plurality of reference signals indicated by the reference signal indication information may have different quasi co-location (QCL) information, that is, the reference signal indication information indicates a plurality of reference signals with different spatial characteristics, which are used for terminal devices corresponding to different spatial information to perform time-frequency tracking.

In a specific implementation, the reference signal may include CSI-RS, TRS, PTRS, DMRS, etc. The reference signal resource set may be configured to the terminal device through the network device, for example, the network device configures the reference signal resource set for the terminal device through a system message, such as SIB1. For the terminal device in the idle state, the configuration of the reference signal resource set may be obtained by receiving the system message, and then one or more resources in the set may be obtained by the reference signal resource indication information. The quantity of bits included in the reference signal resource indication information may be determined by the quantity of resources included in the reference signal resource set configured by the network device, or it may be a fixed quantity of bits.

Configuration signaling of a CSI-RS resource set may be as follows:

---

- NZP-CSI-RS-ResourceSet
  The IE NZP-CSI-RS-ResourceSet is a set of Non-Zero-Power (NZP) CSI-RS resources (their IDs) and set-specific parameters.
  NZP-CSI-RS-ResourceSet information element
  -- ASN1START
  -- TAG-NZP-CSI-RS-RESOURCESET-START
  NZP-CSI-RS-ResourceSet ::= SEQUENCE {

-continued

```
nzp-CSI-ResourceSetId NZP-CSI-RS-ResourceSetId,
nzp-CSI-RS-Resources SEQUENCE (SIZE
(1..maxNrofNZP-CSI-RS-ResourcesPerSet)) OF NZP-CSI-RS-ResourceId,
    repetition ENUMERATED { on, off } OPTIONAL, -- Need S
    aperiodicTriggeringOffset INTEGER(0..6) OPTIONAL, -- Need S
    trs-Info ENUMERATED {true} OPTIONAL, -- Need R
    ...,
    [[
    aperiodicTriggeringOffset-r16 INTEGER(0..31) OPTIONAL -- Need S
    ]]
}
```

Configuration of a CSI-RS resource may include: a period of the CSI-RS resource, a resource element (RE) position of the CSI-RS resource in a physical resource block (PRB), a symbol where the CSI-RS resource is located in a time slot, etc.; the configuration signaling of the CSI-RS resource may be as follows:

```
-- ASN1START
-- TAG-NZP-CSI-RS-RESOURCE-START
NZP-CSI-RS-Resource ::= SEQUENCE {
    nzp-CSI-RS-ResourceId NZP-CSI-RS-ResourceId,
    resourceMapping CSI-RS-ResourceMapping,
    powerControlOffset INTEGER (-8..15),
    powerControlOffsetSS ENUMERATED{db-3, db0, db3, db6}
OPTIONAL, -- Need R
    scramblingID ScramblingId,
    periodicity AndOffset CSI-ResourcePeriodicity AndOffset OPTIONAL,
-- Cond PeriodicOrSemiPersistent
    qcl-InfoPeriodicCSI-RS TCI-StateId OPTIONAL, -- Cond Periodic
    ...
}
```

In the embodiment of the present application, the reference signal resource indication information may indicate a resource ID of the reference signal, such as "nzp-CSI-RS-ResourceId" in the above signaling.

According to the second manner, the information sent by the network device through DCI format 1_0 and received by the terminal device is power saving information, and reference signal resource indication information and power saving wake-up indication information are included in the power saving information. The power saving information is used for indicating whether the terminal device receives a paging message in a corresponding PO, the reference signal resource indication information is used for indicating a resource of a reference signal, and the resource of the reference signal is used for the terminal device to perform time-frequency tracking, AGC and the like through the reference signal before the PO arrives; the DCI format 1_0 is scrambled by P-RNTI. The DCI format 1_0 scrambled by the P-RNTI carries short message indication information (2 bits), short message information (8 bits), and scheduling information of PDSCH carrying the paging message. The short message indication information indicates contents carried by the DCI, as shown in Table 2 below.

TABLE 2

Short Message indication information

| Bit field | Short Message indicator |
|---|---|
| 00 | Reserved |
| 01 | Only scheduling information for Paging is present in the DCI |
| 10 | Only short message is present in the DCI |

TABLE 2-continued

Short Message indication information

| Bit field | Short Message indicator |
|---|---|
| 11 | Both scheduling information for Paging and short message are present in the DCI |

In order to use the DCI format 1_0 scrambled by the P-RNTI to carry the power saving information, the short message indication information may be set to 00, indicating that the DCI is used for indicating the power saving information. Or the short message indication information may be set to 10, further indicating the power saving information through the short message information. The content of the short message, as shown in Table 3 below, includes system message update indication, ETWS and CMAS indications, and indication of stopping monitoring PDCCH in this PO.

TABLE 3

Short Messages information

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this PO. |
| 4-8 | Not used in this release of the specification, and shall be ignored by UE if received. |

In the embodiment of the present application, on the basis that the DCI format 1_0 scrambled by the P-RNTI may indicate to stop monitoring PDCCH in the current PO, the information carried by the DCI format 1_0 may also be expanded, for example, carrying the reference signal resource information in the short message information. In a specific implementation, 8 bits in the short message information field may include 1 bit of power saving wake-up indication information and 7 bits of reference signal resource indication information. Of course, other indication manners may also be used, which is not limited here.

The way of carrying the power saving information in the DCI format 1_0 is not limited to using Short Message information to carry the power saving information, and bit fields other than Short Message indicator and Short Message information may also be used to carry the power saving information. For example, when the Short Message indicator indicates that the DCI format 1-0 only carries Short Message, other bits than the Short Message indicator and the Short Message information field are reserved (which may also be called as reserved bits); therefore, the reserved bits may be redefined to carry the power saving information.

In a specific implementation, the reference signal may include CSI-RS, TRS, PTRS, DMRS, etc. The reference signal resource set may be configured to the terminal device through the network device, for example, the network device configures the reference signal resource set for the terminal device through a system message, such as SIB1. For the terminal device in the idle state, the configuration of the reference signal resource set may be obtained by receiving the system message, and then one or more resources in the set may be obtained by the reference signal resource indication information. The quantity of bits included in the reference signal resource indication information may be determined by the quantity of resources included in the reference signal resource set configured by the network device, or it may be a fixed quantity of bits.

According to the third manner, the information sent by the network device and received by the terminal device is power saving information, and the power saving information and the resource indicated by the reference signal resource indication information have a corresponding relationship.

In some embodiments, the power saving information is carried by a sequence, and the terminal device determines the power saving information by detecting the sequence; if the terminal device detects the sequence, the power saving information indicates to "wake up" the terminal device; if the terminal device does not detect the sequence, the power saving information indicates "not to wake up" the terminal device. Alternatively, different sequences detected by the terminal device may represent different power saving information.

The power saving information and the resource indicated by the reference signal resource indication information have a corresponding relationship, which may be that the sequence carrying the power saving information and the resource of the reference signal have a corresponding relationship; for example, sequences 1-4 respectively correspond to resource IDs 1-4 of the reference signal. It can also be configured that if the terminal device detects the sequences 1-4, the terminal device receives a paging message in a corresponding PO; if the terminal device detects the sequence 1, the terminal device determines that the resource of the reference signal is the resource ID1 of the reference signal. If the terminal device does not detect the sequences 1-4, the terminal device does not receive the paging message in the corresponding PO.

According to the fourth manner, the information sent by the network device received by the terminal device is power saving information, and a resource for transmitting a reference signal has a corresponding relationship with a sequence carrying power saving information and a time-frequency resource of the sequence carrying the power saving information. The sequence carrying power saving information includes sequences 1-2, and the time-frequency resources where sequences are located include resources 1-2, so it may be defined that the combinations of the sequences and the time-frequency resources correspond to reference signal resource IDs 1-4, for example, the combination of sequence 1 and resource 1 corresponds to reference signal resource ID 1; the combination of sequence 1 and resource 2 corresponds to reference signal resource ID 2; the combination of sequence 2 and resource 1 corresponds to reference signal resource ID 3; the combination of sequence 2 and resource 2 corresponds to reference signal resource ID 4.

Figure 11:
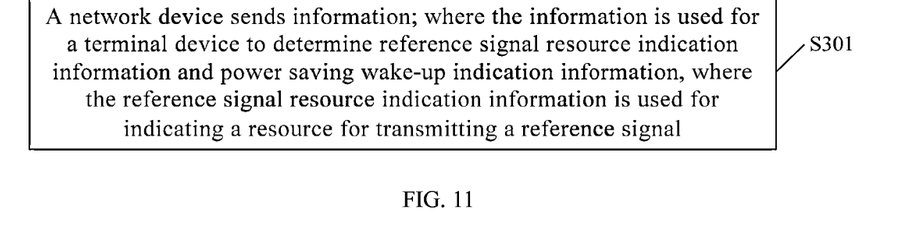
FIG. 11 is a schematic diagram of another processing flow of a resource indication method provided by an embodiment of the present application.

As shown in FIG. 11, another processing flow of a resource indication method provided by an embodiment of the present application includes the following step.

S301, a network device sends information; where the information is used for a terminal device to determine reference signal resource indication information and power saving wake-up indication information, where the reference signal resource indication information is used for indicating a resource for transmitting a reference signal.

In some embodiments, the network device sends the information to the terminal device; the description of the information is the same as the description of the information in step S201 in the above embodiment, and will not be repeated here. The description of the terminal device determining the reference signal resource indication information and the power saving wake-up indication information is the same as the description of the information in step S202 in the above embodiments, and will not be repeated here.

Figure 12:
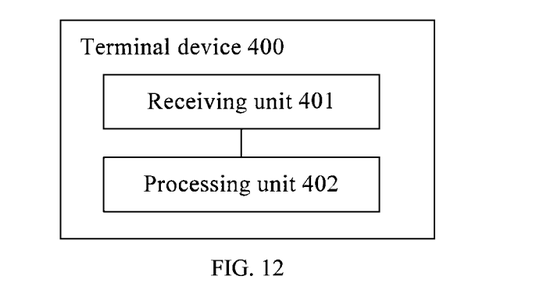
FIG. 12 is a schematic diagram of a composition structure of a terminal device provided by an embodiment of the present application.

To realize the resource indication method provided by the embodiment of the present application, an embodiment of the present application further provides a terminal device, and a composition structure of the terminal device 400, as shown in FIG. 12, includes:

a receiving unit 401, configured to receive information;

a processing unit 402, configured to determine reference signal resource indication information and power saving wake-up indication information according to the information, where the reference signal resource indication information is used for indicating a resource for transmitting a reference signal.

In some embodiments, both the reference signal resource indication information and the power saving wake-up indication information are carried in the information.

In some embodiments, the information is carried by first DCI with a format of 2-6.

In some embodiments, the reference signal resource indication information is indicated by a bit field other than a bit field corresponding to the power saving wake-up indication information in the first DCI.

In some embodiments, the reference signal resource indication information and the power saving wake-up indication information have a corresponding relationship.

In some embodiments, if the information includes the power saving wake-up indication information, the reference signal resource indication information is determined by the power saving wake-up indication information;

or, if the information includes the reference signal resource indication information, the power saving wake-up indication information is determined by the reference signal resource indication information.

In some embodiments, the information is carried by second DCI with a format of 1-0.

In some embodiments, the reference signal resource indication information is indicated by a bit field corresponding to short message information in the second DCI;

or, the reference signal resource indication information is indicated by a bit field corresponding to a reserved bit in the second DCI.

In some embodiments, the resource for transmitting the reference signal and a sequence carrying the power saving wake-up instruction information have a corresponding relationship.

In some embodiments, the reference signal resource indication information is determined by a time-frequency resource carrying the power saving wake-up indication information.

In some embodiments, the resource for transmitting the reference signal indicated by the reference signal resource indication information has a corresponding relationship with a sequence carrying the power saving wake-up indication information and a time-frequency resource of the sequence carrying the power saving wake-up indication information.

In some embodiments, the processing unit 402 is further configured to determine a time domain resource of the reference signal.

In some embodiments, the time domain resource is determined by a time interval between an end time of a time period in which a time domain resource for transmitting the power saving wake-up indication information is located and a start time of a paging occasion or a paging frame corresponding to the power saving wake-up indication information; and the time domain resource for transmitting the power saving wake-up indication information is configured by a network device or pre-configured.

In some embodiments, the time domain resource is determined by a time interval between an end time of a time domain resource of a signal or channel carrying the power saving wake-up indication information, or an end time of a time slot where the time domain resource is located, and a start time of a paging occasion or a paging frame corresponding to the power saving wake-up indication information.

In some embodiments, the time domain resource includes a time domain resource corresponding to a time slot in which the reference signal exists in the time interval.

In some embodiments, the time domain resource is predefined, or the time domain resource is indicated by the information.

In some embodiments, the resource for transmitting the reference signal includes:

at least one resource in a reference signal resource set configured by a network device.

In some embodiments, the reference signal resource set is configured by a system message.

In some embodiments, different reference signals have different quasi-colocation information.

In some embodiments, the reference signal includes at least one of the following: CSI-RS, DMRS, TRS, PTRS and PRS.

Figure 13:
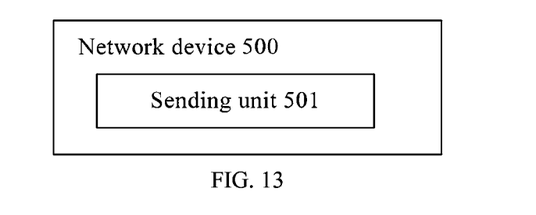
FIG. 13 is a schematic diagram of a composition structure of a network device provided by an embodiment of the present application.

To realize the resource indication method provided by the embodiment of the present application, an embodiment of the present application further provides a network device, and a composition structure of the network device 500, as shown in FIG. 13, includes:

a sending unit 501, configured to send information; where the information is used for a terminal device to determine reference signal resource indication information and power saving wake-up indication information, and the reference signal resource indication information is used for indicating a resource for transmitting a reference signal.

In some embodiments, both the reference signal resource indication information and the power saving wake-up indication information are carried in the information.

In some embodiments, the information is carried by first DCI with a format of 2-6.

In some embodiments, the reference signal resource indication information is indicated by a bit field other than a bit field corresponding to the power saving wake-up indication information in the first DCI.

In some embodiments, the reference signal resource indication information and the power saving wake-up indication information have a corresponding relationship.

In some embodiments, if the information includes the power saving wake-up indication information, the reference signal resource indication information is determined by the power saving wake-up indication information;

or, if the information includes the reference signal resource indication information, the power saving wake-up indication information is determined by the reference signal resource indication information.

In some embodiments, the information is carried by second DCI with a format of 1-0.

In some embodiments, the reference signal resource indication information is indicated by a bit field corresponding to short message information in the second DCI;

or, the reference signal resource indication information is indicated by a bit field corresponding to a reserved bit in the second DCI.

In some embodiments, the resource for transmitting the reference signal and a sequence carrying the power saving wake-up instruction information have a corresponding relationship.

In some embodiments, the reference signal resource indication information is determined by a time-frequency resource carrying the power saving wake-up indication information.

In some embodiments, the resource for transmitting the reference signal indicated by the reference signal resource indication information has a corresponding relationship with a sequence carrying the power saving wake-up indication information and a time-frequency resource of the sequence carrying the power saving wake-up indication information.

In some embodiments, a time domain resource of the reference signal is determined by a time interval between an end time of a time period in which a time domain resource for transmitting the power saving wake-up indication information is located and a start time of a paging occasion or a paging frame corresponding to the power saving wake-up indication information; and the time domain resource for transmitting the power saving wake-up indication information is configured by the network device or pre-configured.

In some embodiments, a time domain resource of the reference signal is determined by a time interval between an end time of a time domain resource of a signal or channel carrying the power saving wake-up indication information, or an end time of a time slot where the time domain resource is located, and a start time of a paging occasion or a paging frame corresponding to the power saving wake-up indication information.

In some embodiments, the time domain resource of the reference signal includes a time domain resource corresponding to a time slot in which a reference signal exists in the time interval.

In some embodiments, the time domain resource of the reference signal is predefined, or the time domain resource of the reference signal is indicated by the information.

In some embodiments, the resource for transmitting the reference signal includes:

at least one resource in a reference signal resource set configured by the network device.

In some embodiments, the reference signal resource set is configured by a system message.

In some embodiments, different reference signals have different quasi-colocation information.

In some embodiments, the reference signal includes at least one of the following: CSI-RS, DMRS, TRS, PTRS and PRS.

An embodiment of the present application further provides a terminal device, including a processor and a memory configured to store a computer program that is capable of being run on the processor, where the processor is configured to execute the steps of the resource indication method executed by the terminal device when running the computer program.

An embodiment of the present application further provides a network device, including a processor and a memory configured to store a computer program that is capable of being run on the processor, where the processor is configured to execute the steps of the resource indication method executed by the network device when running the computer program.

An embodiment of the present application further provides a chip, including: a processor configured to call and run a computer program from a memory, to cause a device installed with the chip to execute the resource indication method executed by the terminal device.

An embodiment of the present application further provides a chip, including: a processor configured to call and run a computer program from a memory, to cause a device installed with the chip to execute the resource indication method executed by the network device.

An embodiment of the present application further provides a storage medium storing an executable program, which, when being executed by a processor, implements the resource indication method executed by the terminal device.

An embodiment of the present application further provides a storage medium storing an executable program, which, when being executed by a processor, implements the resource indication method executed by the network device.

An embodiment of the present application further provides a computer program product including computer program instructions, and the computer program instructions cause a computer to execute the resource indication method executed by the terminal device.

An embodiment of the present application further provides a computer program product including computer program instructions, and the computer program instructions cause a computer to execute the resource indication method executed by the network device.

An embodiment of the present application further provides a computer program, and the computer program causes a computer to execute the resource indication method executed by the terminal device.

An embodiment of the present application further provides a computer program, and the computer program causes a computer to execute the resource indication method executed by the network device.

Figure 14:
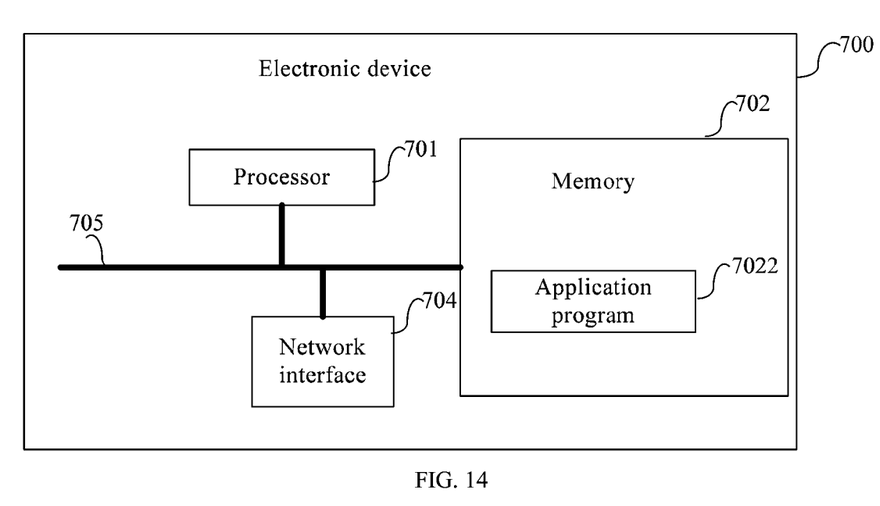
FIG. 14 is a schematic structural diagram of a hardware composition of an electronic device provided by an embodiment of the present application.

FIG. 14 is a schematic structural diagram of a hardware composition of an electronic device (a terminal device or a network device) provided by an embodiment of the present application. An electronic device 700 includes: at least one processor 701, a memory 702 and at least one network interface 704. Various components in the electronic device 700 are coupled together by a bus system 705. It can be understood that the bus system 705 is configured to realize the connection communication between these components. The bus system 705 includes a power bus, a control bus and a status signal bus in addition to a data bus. However, for the sake of clarity, various buses are labeled as the bus system 705 in FIG. 14.

It can be understood that the memory 702 may be a volatile memory or a nonvolatile memory, and may also include both volatile and nonvolatile memories. The nonvolatile memory may be a ROM, a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or a compact disc read-only memory (CD-ROM); the magnetic surface memory may be a magnetic disk memory or a tape memory. The volatile memory may be a random access memory (RAM), which is used as an external cache. By way of illustration but not limitation, many forms of RAM are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronized link dynamic random access memory (SLDRAM) and a direct rambus random access memory (DRRAM). The memory 702 described in the embodiment of the present application is intended to include, but is not limited to, these and any other suitable types of memories.

The memory 702 in the embodiment of the present application is configured to store various types of data to support the operation of the electronic device 700. Examples of such data include any computer program used to operate on the electronic device 700, such as an application program 7022. The program for implementing the method of the embodiment of the present application may be included in the application program 7022.

The methods disclosed in the embodiments of the present application may be applied to or implemented by the processor 701. The processor 701 may be an integrated circuit chip with signal processing capability. In the implementation process, each step of the above methods may be completed by a hardware integrated logic circuit or instructions in the form of software in the processor 701. The above processor 701 may be a general-purpose processor, a digital signal processor (DSP), or other programmable logic devices, discrete gate or transistor logic devices, discrete hardware components, etc. The processor 701 may implement or execute the methods, steps and logic blocks disclosed in the embodiments of the present application. The general-purpose processor may be a microprocessor or any conventional processor, etc. The steps of the methods disclosed in connection with the embodiments of the present application may be directly embodied as being executed and completed by a hardware decoding processor, or by a combination of hardware and software modules in the decoding processor. The software modules may be located in the storage medium, which is located in the memory 702, and the processor 701 reads the information in the memory 702 and completes the steps of the aforementioned methods in combination with its hardware.

In an illustrative embodiment, the electronic device 700 may be implemented by one or more application specific integrated circuits (ASIC), DSPs, programmable logic devices (PLD), complex programmable logic devices (CPLD), field programmable gate arrays (FPGAs), general-purpose processors, controllers, micro control units (MCUs), micro processor units (MPUs), or other electronic components, and is used to execute the aforementioned methods.

The present application is described with reference to flowcharts and/or block diagrams of methods, devices (systems), and computer program products according to embodiments of the present application. It should be understood that each flow and/or block in the flowcharts and/or block diagrams, and combinations of flows and/or blocks in the flowcharts and/or block diagrams may be realized by computer program instructions. These computer program instructions may be provided to a processor of a general-purpose computer, a special-purpose computer, an embedded processor or other programmable data processing device to produce a machine, so that the instructions executed by the processor of the computer or other programmable data processing device produce a means for implementing functions specified in one or more flows of the flowcharts and/or one or more blocks of the block diagrams.

These computer program instructions may also be stored in a computer-readable memory that can direct a computer or other programmable data processing device to operate in a specific way, so that the instructions stored in the computer-readable memory produce a manufacture including an instruction means that implements the functions specified in one or more flows of the flowcharts and/or one or more blocks of the block diagrams.

These computer program instructions may also be loaded on a computer or other programmable data processing device, so that a series of operation steps are executed on the computer or other programmable device to produce a computer-implemented process, so that the instructions executed on the computer or other programmable device provide steps for implementing functions specified in one or more flows of the flowcharts and/or one or more blocks of the block diagrams.

It should be understood that the terms "system" and "network" in the present application are often used interchangeably herein. In the present application, the term "and/or" is merely a kind of association relationship to describe associated objects, and it represents that there may be three kinds of relationships, for example, A and/or B, can represent that A exists alone, both A and B exist, and B exists alone. In addition, the character "/" in the present application generally indicates that the associated objects before and after are in an "OR" relationship.

The above is only the preferred embodiments of the present application, which is not intended to limit the scope of protection of the present application. Any modification, equivalent replacement and improvement made within the spirit and principle of the present application should be included in the scope of protection of the present application.

What is claimed is:

1. A resource indication method, comprising:
   receiving, by a terminal device, information;
   determining, by the terminal device, reference signal resource indication information and power saving wake-up indication information according to the information, wherein the reference signal resource indication information is used for indicating a resource for transmitting a reference signal, wherein the reference signal comprises a tracking reference signal (TRS);
   wherein both the reference signal resource indication information and the power saving wake-up indication information are carried in the information;
   wherein the method further comprises:
   determining, by the terminal device, a time domain resource of the reference signal;
   wherein the resource for transmitting the reference signal comprises:
   at least one resource in a reference signal resource set configured by a network device;
   wherein the reference signal resource set is configured by a system message;
   wherein at least two different reference signals have different quasi-colocation information.

2. A resource indication method, comprising:
   sending, by a network device, information; wherein the information is used for a terminal device to determine reference signal resource indication information and power saving wake-up indication information, wherein the reference signal resource indication information is used for indicating a resource for transmitting a reference signal, wherein the reference signal comprises a tracking reference signal (TRS);
   wherein both the reference signal resource indication information and the power saving wake-up indication information are carried in the information;
   wherein the resource for transmitting the reference signal comprises:
   at least one resource in a reference signal resource set configured by the network device;
   wherein the reference signal resource set is configured by a system message;
   wherein at least two different reference signals have different quasi-colocation information.

3. A terminal device, comprising a processor and a memory configured to store a computer program that is capable of being run on the processor, wherein
   the processor, when running the computer program, is caused to:
   receive information;
   determine reference signal resource indication information and power saving wake-up indication information according to the information, wherein the reference signal resource indication information is used for indicating a resource for transmitting a reference signal, wherein the reference signal comprises a tracking reference signal (TRS);
   wherein both the reference signal resource indication information and the power saving wake-up indication information are carried in the information;
   the processor, when running the computer program, is further caused to:
   determine a time domain resource of the reference signal;
   wherein the resource for transmitting the reference signal comprises:
   at least one resource in a reference signal resource set configured by a network device;
   wherein the reference signal resource set is configured by a system message;
   wherein at least two different reference signals have different quasi-colocation information.

4. A network device, comprising a processor and a memory configured to store a computer program that is capable of being run on the processor, wherein
   the processor is configured to execute steps of the resource indication method according to claim 2 when running the computer program.

5. A non-transitory storage medium storing an executable program, which, when being executed by a processor, implements the resource indication method according to claim 1.

6. A non-transitory storage medium storing an executable program, which, when being executed by a processor, implements the resource indication method according to claim 2.

7. A chip, comprising: a processor configured to call and run a computer program from a memory, to cause a device installed with the chip to execute the resource indication method according to claim 1.

8. A chip, comprising: a processor configured to call and run a computer program from a memory, to cause a device installed with the chip to execute the resource indication method according to claim 2.

* * * * *